June 2, 1931.

A. SPRUNG ET AL

SIGN FRAME AND UPRIGHT

Original Filed Nov. 10, 1922

Re. 18,087

2 Sheets-Sheet 1

INVENTORS
Abraham Sprung
Joseph Sprung
BY
Charles L. Wright
ATTORNEY

A. SPRUNG ET AL
June 2, 1931. SIGN FRAME AND UPRIGHT Re. 18,087
Original Filed Nov. 10, 1922 2 Sheets-Sheet 2
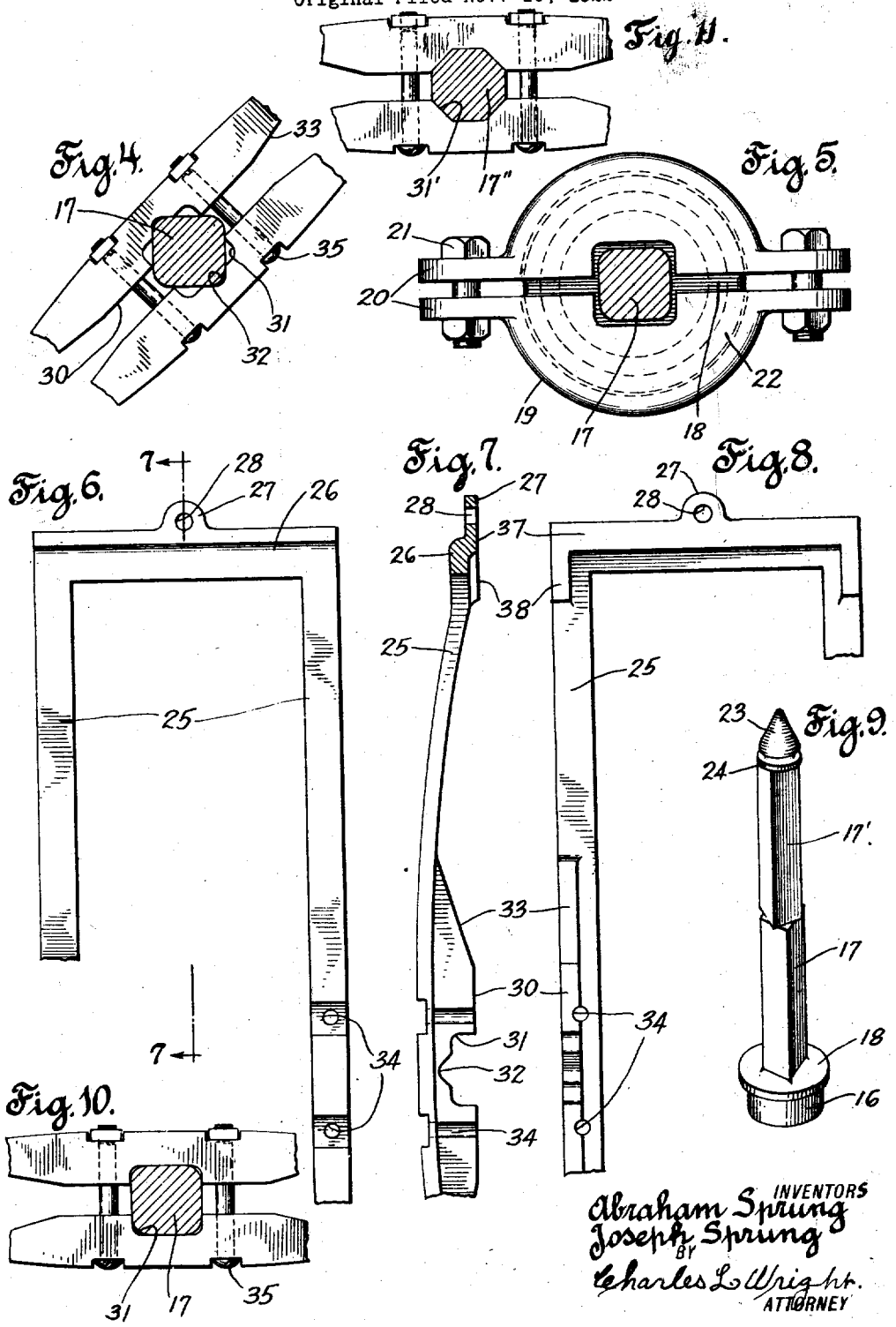
INVENTORS
Abraham Sprung
Joseph Sprung
By Charles L. Wright
ATTORNEY Reissued June 2, 1931 Re. 18,087

UNITED STATES PATENT OFFICE

ABRAHAM SPRUNG, OF BROOKLYN, AND JOSEPH SPRUNG, OF NEW YORK, N. Y., ASSIGNORS TO MUNICIPAL STREET SIGN CO. INC., OF NEW YORK, N. Y., A CORPORATION OF NEW YORK

SIGN FRAME AND UPRIGHT

Original No. 1,529,752, dated March 17, 1925, Serial No. 599,969, filed November 10, 1922. Application for reissue filed February 19, 1931. Serial No. 517,084.

This invention relates to improvements in sign frames and supports therefor, the principal object being to provide a pair of oppositely facing metal frames suited to carry a sheet metal sign so as to disclose the inscription from both sides.

Another purpose is in the provision of a rigid support upright suited to be secured upon a post or standard and having faces fitted to enter between the rear or inner surfaces of the sign frames so as to maintain them in a fixed position.

A further aim is to arrange the support upright in such manner as to hold two or more pairs of the sign frames co-incidently and locked at any angle with respect to each other.

These and other aims, objects and purposes, such as rigidity of structure, economy in manufacture, and ease in assembling, are accomplished by the novel construction and combination of parts hereinafter described and shown in the accompanying drawings, forming a material part of this disclosure, and in which:—

Figure 4 is a similar view of the same parts but arranged at different angles.

Figure 5 is a transverse sectional view taken on line 5—5 of Fig. 2.

Figure 6 is a fragmentary front view showing a portion of one of the sign frames.

Figure 7 is a longitudinal sectional view taken on line 7—7 of Fig. 6.

Figure 8 is a partial rear view of the same.

Figure 9 is a perspective view showing a modificaiton of the frame support upright.

Figure 10 is a fragmentary sectional view, similar to Figs. 3 and 4 but showing a modification suited to engage the upright shown in Fig. 9.

Figure 11 is a similar view but showing another modification in the shape of the sign frame recesses.

As will be recognized, this invention is adapted for use particularly at the intersections of streets, highways, lanes and like places where fixed directions are desirable and where fixed posts may be permanently located.

Figure 1:
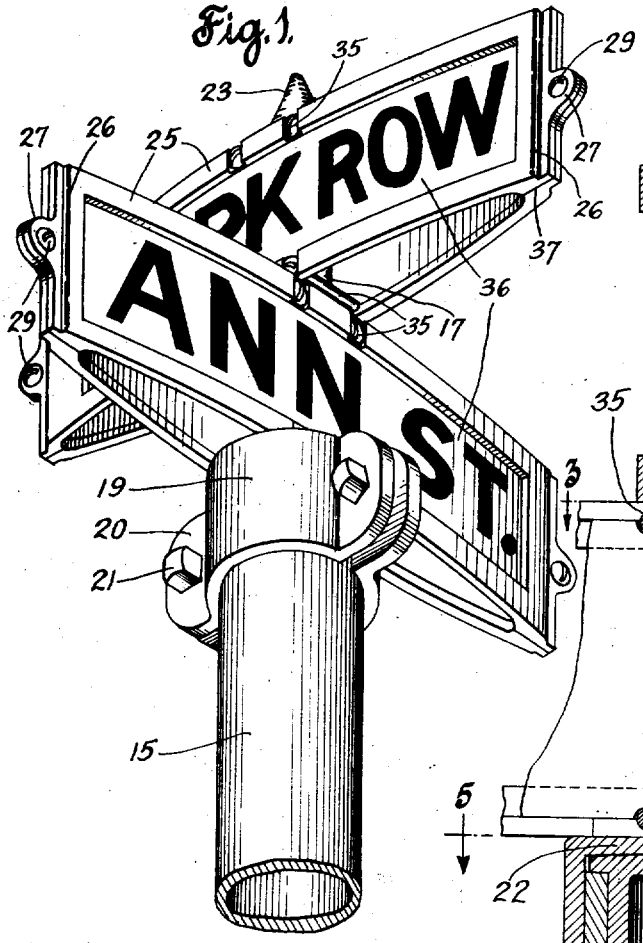
Figure 1 is a perspective view of a complete assembly of a preferred embodiment of the invention, illustrating its application.
Figure 2:
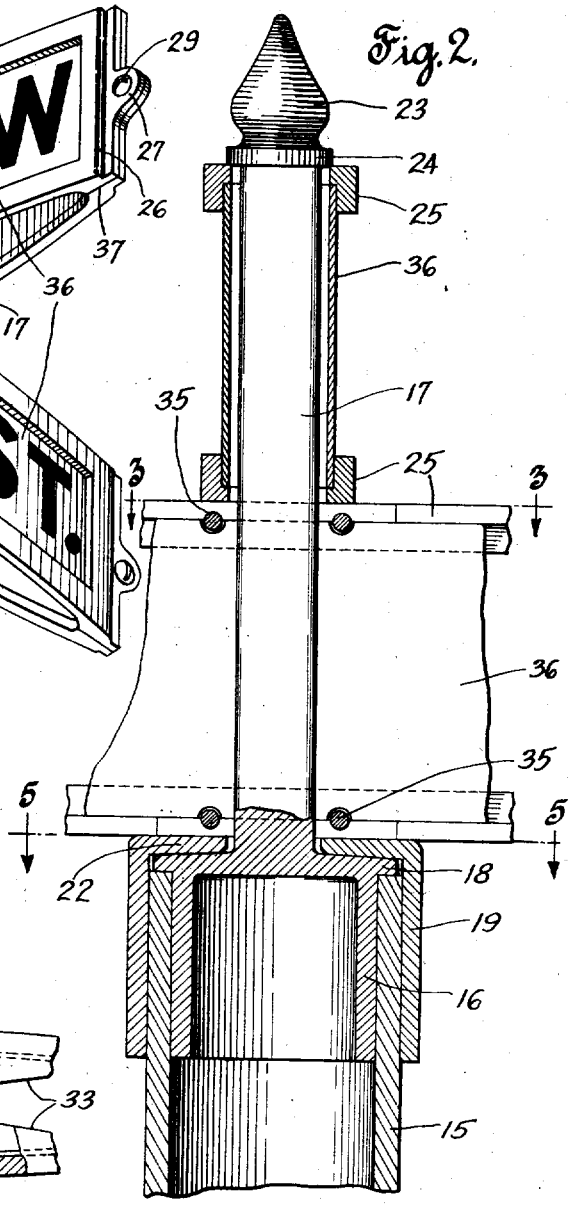
Figure 2 is an enlarged vertical sectional view taken through the center thereof.
Figure 3:
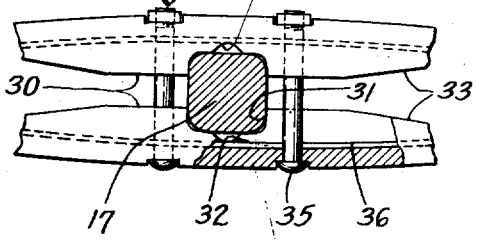
Figure 3 is a fragmentary transverse sectional view taken on line 3—3 of Fig. 2.

These posts, designated by the numeral 15 in the drawings, are preferably tubular having their ends cut squarely across as indicated best in Figure 2.

Fitted to the open top of the post is the hollow circular base 16 of an upright 17 the latter being of rectangular cross-section and having, at its junction of the base, an outstanding flange 18 suited to engage the top of the post into which the base is tightly driven.

A pair of semi-circular clamps 19 surround the upper end of the post, the same being provided with lugs 20 receptive of bolts 21 by which the clamps are drawn into tight engagement with the post, and formed with each clamp element is an inreaching flange 22 suited to extend over the outer surface of the base flange 18, binding the upright rigidly to the post 15 but permitting the upright to be rotated relative to the post prior to final tightening of the bolts.

The upper end of the upright is provided with an ornamental knob or terminal 23 having a flanged shoulder 24, between which shoulder and the flanges 22 are received the sign frames.

Each frame, as best shown in Figs. 6, 7, and 8, consists of a pair of longitudinal side members 25 bowed arcuately outward and connected in spaced parallel relation by end elements 26 having lugs 27 extending outwardly from the center of their length, provided with holes 28 to receive clamping bolts 29.

Midway in the length of the frame sides 25, on their inner surfaces, are hub-like projections 30 containing openings 31, suited to engage the upright 17 as shown in Fig. 5 and in the bottom of these recesses are angular cavities 32 receptive of the corners of the upright when presented to them, as in Fig. 4.

These hub-like extensions are stiffened by ribs 33 and are provided with pairs of openings 34 for the reception of clamping bolts 35 by which the pair of frames are rigidly held to the upright.

The sign plates 36 are oblong rectangular, their ends abutting the cleat elements 37 of the frame ends 26 and guided by the lateral elements 38 and further held in the center of the frame by the rib elements 33 on the frame sides, it being understood that the sign plate is sprung inward by contact with the elements 37 to conform to the curvature of the frame.

Thus it will be seen that by clamping a pair of sign frames, having the desired sign therein, back to back upon the upright previously fixed on a mast, that the same are firmly secured and further, due to the overhanging elements 22 of the clamps, and that the signs may be arranged at an angle of 45 degrees or multiples thereof from any face of the square upright.

It will be equally apparent that one pair of signs may be held at one angle and the other pair at another angle according to the side or corner of the upright upon which they are clamped.

In the modification shown in Fig. 9, a greater degree of angular latitude is obtainable, due to the arrangement of the upper portion 17′ of the upright 17, which can be formed at any angle from the lower portion, thus providing a wide range of angular relation.

Figure 10 shows the simplest arrangement in which the sign frames are provided with square recesses 31 only suited to engage the upright 17, and the modification illustrated in Fig. 11 illustrates a frame having between its two sides a hexagonal opening 31′ suited to receive a corresponding cross-sectioned upright 17″.

Although we have described our improvements with considerable detail and with respect to certain particular forms of our invention, we do not desire to be limited to such details since many changes and modifications may well be made without departing from the spirit and scope of our invention in its broadest aspect.

Having thus described our invention, what we claim as new and desire to secure by Letters Patent, is:—

1. A sign comprising pairs of sign carrying frames, an upright to which said frames may be secured, a hollow support for said upright, a flange at the base of said upright suited to rest on said support, a hollow bushing below said base enterable into said support, a pair of curved clamps adapted to grip said support, and in reaching flanges formed with said clamps arranged to extend over said base flange.

2. A sign comprising pairs of sign carrying frames and an upright engageable between each of said pairs, said upright being of regular polygonal cross section, one portion of said upright being twisted with respect to another portion.

3. A sign comprising plates arranged in pairs, frames for each pair of plates, said frames being outwardly convex, an integral rigid upright having sections of corresponding polygonal cross area, said sections being disposed in a common axis but having their faces in different planes, and means for securing said frames to said upright.

4. A sign comprising plates arranged in pairs, frames for each pair of plates, said frames being outwardly convex, an integral rigid upright having a distinct portion for each pair of frames, said portions being of uniform cross section arranged in unlike planes with respect to their faces, and means in said frame receptive of the upright.

5. A sign comprising pairs of sign carrying frames, an upright to which said frames are attached, a support for said upright, a pair of semi-cylindrical elements for clamping the base of said upright to said support and means integral with said elements for closing the end of said support.

6. A sign comprising pairs of sign carrying frames, an upright to which said frames are attached, a support for said upright, a pair of semi-circular clamps engaging said support, and flanges formed with said clamps adapted to engage the upper surface of the base of said uprights rigidly on the top of said support.

7. A street sign comprising pairs of plates, frames for each pair of plates, said frames being outwardly convexed, the central portion of adjacent sides of each pair of frames containing a recess, and an upright adapted to enter in said recesses, said upright being in cross-section, a regular polygon of not more than eight sides, a hollow support for said upright, said upright having a base member having a portion adapted to enter in said tubular support and a flange adapted to overlie said tubular support.

8. A street sign comprising pairs of plates, frames for each pair of plates, said frames being outwardly convexed, the central portion of adjacent sides of each pair of frames containing a recess, and an upright suited to enter into the mentioned recesses, the portion of said upright disposed between said plates and frames being of substantially rectangular cross-section throughout, the recessed portions of said frames being adapted to engage opposite parallel surfaces of said upright.

9. A street sign comprising pairs of plates, frames for each pair of plates, said frames being outwardly convexed the central portions of adjacent sides of each pair of frames containing a recess, and an upright suited to enter into the mentioned recesses, said upright having a pair of substantially flat parallel surfaces contacting each pair of said recessed portions.

10. A street sign comprising pairs of plates, frames for each pair of plates, said frames being outwardly convexed a central portion of adjacent sides of each pair of frames containing a recess, and an upright suited to enter into the mentioned recesses, the portion of said upright disposed between said plates and frames being in cross-section, substantially a regular polygon of even number of sides throughout, the recessed portions of said frames being adapted to engage opposite parallel surfaces of said upright.

Signed at New York city, in the State of New York, this 17 day of February, 1931.

ABRAHAM SPRUNG.
JOSEPH SPRUNG.